United States Patent [19]

Nocek

[11] Patent Number: 4,617,276

[45] Date of Patent: Oct. 14, 1986

[54] NOVEL METHOD FOR QUANTITATING STRUCTURAL AND NON-STRUCTURAL CARBOHYDRATES IN FEEDSTUFFS

[75] Inventor: James E. Nocek, Lafayette, N.Y.

[73] Assignee: Agway Inc., Dewitt, N.Y.

[21] Appl. No.: 773,054

[22] Filed: Sep. 6, 1985

Related U.S. Application Data

[62] Division of Ser. No. 694,105, Jan. 23, 1985.

[51] Int. Cl.$^4$ ............................................. G01N 31/00
[52] U.S. Cl. ........................................ 436/20; 436/71; 436/86; 436/94; 436/95; 436/908
[58] Field of Search .................. 426/2, 231, 623, 630, 426/807; 436/20, 94, 95, 71, 86, 155, 908

[56] References Cited

U.S. PATENT DOCUMENTS

| | | | |
|---|---|---|---|
| 4,086,365 | 4/1978 | Snetsinger et al. | 426/807 X |
| 4,118,513 | 10/1978 | Braud et al. | 426/2 |
| 4,186,213 | 1/1980 | Burroughs et al. | 426/807 X |
| 4,377,596 | 3/1983 | Larsen | 426/807 X |

FOREIGN PATENT DOCUMENTS 2924753  1/1981  Fed. Rep. of Germany ...... 426/231

OTHER PUBLICATIONS

Monison, "Feeds & Feeding", The Monison Publishing Co. (1957) pp. 10–16, 649–652 & 1083–1085.

*Primary Examiner*—R. B. Penland
*Attorney, Agent, or Firm*—Charles S. McGuire

[57] ABSTRACT

A novel method of determining the portion of a given dairy cow feedstuff which is attributable to non-structural carbohydrates is disclosed. The method includes the steps of analytically determining the percentages of crude protein, lipid and ash in the dry matter concentration of a first feed sample, and in the neutral detergent fiber which has been separated from the soluble matter of a second sample of the same feed, and subtracting the amounts of crude protein, lipid and ash in the neutral detergent fiber from the respective amounts of the same substances in the original sample. The three difference figures are totaled and subtracted from the percentage of the second sample represented by neutral detergent solubles, i.e., 100 minus neutral detergent fiber, thereby providing an accurate indication of the percentage of non-structural carbohydrate in the feedstuff. The method is applied to both forages and grains, and is employed in the formulation of dairy cow rations wherein ration is adjusted to optimize milk production, the preferred percentage being from about 30% to about 45% depending on forage type.

7 Claims, No Drawings

NOVEL METHOD FOR QUANTITATING STRUCTURAL AND NON-STRUCTURAL CARBOHYDRATES IN FEEDSTUFFS

REFERENCE TO RELATED APPLICATION

This is a division of application Ser. No. 694,105, filed Jan. 23, 1985, of James E. Nocek et al, now abandoned, and is also related to application Ser. No. 772,011, filed Sept. 3, 1985 which is a continuation-in-part of the aforementioned parent of the present application.

BACKGROUND OF THE INVENTION

The present invention relates to analytical methods of quantitating the non-structural carbohydrate of a feedstuff and has particular utility in determining the non-structural carbohydrate content of both grain and forage components of dairy cow rations.

It is well known, of course, that carbohydrates are the principal energy source for many animals, as well as humans. Plant carbohydrates may be categorized in two major groups, namely, structural and non-structural. The structural carbohydrates, found in the cell wall, are essentially rigid in nature, providing strength to the cell walls and thus to the plant itself. The fibrous materials which make up the cell walls, i.e., the structural carbohydrates, also known as meutral detergent fiber, are mainly cellulose, hemicellulose, and lignin. Non-structural carbohydrates, found mainly within the lumen of the cell, include sugars and starch. Although pectins (D-methyl-galacturonic acid) are a soluble component of the cell wall, they are almost completely digestible (98%) in the rumen. In addition, they are precipitated out of the cell wall by ethylene diamine tetra acetic acid (EDTA) which is contained in neutral detergent solution. A significant amount of pectin substances are contained in leguminous feedstuff fed to animals (e.g., alfalfa, soybean meal, beet pulp, etc.). These pectin substances may physically be associated with the cell wall, but chemically they are associated with and behave like cell solubles; therefore, they are also considered a part of the non-structural carbohydrates.

The major source of structural carbohydrates in dairy cattle rations is forage. The quality and degree of structural carbohydrate availability (digestability) to rumen microorganisms in different forages are quite variable, being influenced by such factors as plant variety, maturity at harvest and storage conditions. Grains generally have more non-structural carbohydrates and are generally less variable in carbohydrate content than forage.

It has been generally accepted that structural carbohydrate is a negative indicator of ration energy concentration. That is, the more structural carbohydrate a given ration contains, the less energy value it provides, and vice versa. Present energy-based feeding systems for ruminants are based on this relationship.

In order to develop a feeding system which includes regulation of carbohydrates in the total daily ration, it is necessary, of course, to have available an accurate and repeatable method of quantitating both structural and non-structural carbohydrates in each constituent of the ration. A procedure which has been used in the past to separate structural and non-structural carbohydrates involves refluxing a given sample in a neutral detergent solution and filtering out the insoluble portion, termed "neutral detergent fiber." It has been generally assumed that, for practical purposes, the netural detergent fiber could be equated to the structural carbohydrate portion of the sample and, conversely, the neutral detergent solubles were essentially the non-structural carbohydrate portion. However, the fractions of non-carbohydrate substances present in both the neutral detergent fiber and solubles are significant to a degree that a reliable regulated carbohydrate feeding program cannot be based upon such generalizations.

Another chemical procedure which has been used to quantitate total non-structural carbohydrate (TNC) utilizes an enzyme called Taka-Diastase. (see Smith, D. "Removing and Analyzing Total Non-Structural Carbohydrates From Plant Tissue." Wisconsin Agr. Exp. Sta. Res. Rep. 41, 1969). The procedure has also been modified, utilizing *Bacillus subtilis* type III Aαamylase (see Madriz, J. M. S. Thesis, Cornell Univ., pp. 76, 77, 1981). These procedures basically involve the chemical action of enzymes on the plant material under consideration. Although theoretically measuring the total amount of non-structural carbohydrate in a sample, the enzyme dictates what is being digested and therefore what is being quantitated.

The Taka-Diastase enzyme is an α amylase derived from *Aspergillus oryzae*, an organism grown on sterilized wheat bran or rice hulls. This extracted enzyme represents more than 30 different enzymatic functions, and is not only amylolytic, but digests proteins and fats as well, according to *Merck Index,* 9th, Ed., p. 81, #633 (1976). *Bacillus subtilis* type III A enzyme has specific properties to hydrolyze, $\alpha$1-4 glucosidic linkages of polysaccharides (starch), also according to Merck Index, supra. The activity of the latter enzyme may therefore be too "specific" to estimate all non-structural carbohydrates in a feedstuff. Therefore, non-structural carbohydrate measurements based on these enzymatic procedures are subject to variability and inconsistencies.

The principal object of the present invention is to provide a novel method of measuring the amounts of structural and non-structural carbohydrates in a given plant material.

Another object is to provide a method which is more accurate and reliable than previous, conventional methods for determining the structural and non-structural carbohydrate content of plant materials used as feedstuffs in cattle rations.

A further object is to provide an accurate and repeatable method for quantitating the structural and non-structural carbohydrate content of feedstuffs to permit formulation of dairy cow rations in a manner providing a positive response in milk production.

Other objects will in part be obvious and will in part appear hereinafter.

SUMMARY OF THE INVENTION

The method of measuring the carbohydrate content of feedstuffs according to the present invention is based upon quantitation of non-structural carbohydrates in the dry matter of a sample by a "difference" method. The dry matter concentration of two essentially chemically identical samples of the feedstuff is determined by drying a portion thereof. Soluble ingredients are removed from one of the samples by refluxing with netural detergent solution and filtering. The portion which is not dissolved, termed "neutral detergent fiber," consists essentially of structural carbohydrates, as well as neutral detergent insoluble crude proteins, lipid and ash. The material which is dissolved ("neutral detergent solubles") contains non-structural carbohydrates, consisting primarily of starch, various sugar moieties, and pectin, as well as netural detergent soluble crude proetin, lipid and ash.

The other dry matter sample and the neutral detergent fiber are separately analyzed to determine the respective percentages thereof constituted by crude protein, lipid and ash. Crude lipid is extracted with ether and ash is measured by weight after exposure of the samples to 500° for 3 hours. The non-structural carbohydrate content may then be calculated by subtracting from the neutral detergent solubles (i.e., 100 minus neutral detergent fiber) the sums of the crude protein, lipid and ash in the feed sample, each reduced by the respective crude protein, lipid and ash in the neutral detergent fiber of the other sample.

DETAILED DESCRIPTION

Quantitation of non-structural carbohydrates according to the method of the present invention involves a determination of dry matter concentration in a feed sample, ground to pass through a 1 mm screen, the separation of neutral detergent fiber and solubles in a dry matter sample, and the calculation of protein, lipid and ash content. Known quantities (e.g., 2 to 5 grams) of two substantially chemically identical subsamples of a given feedstuff are allowed to dry in a forced air oven at 55° C. for 48 hours. The difference in weight of the subsamples before and after drying provides the original moisture content and dry matter concentration. One of the samples is then refluxed with neutral detergent solution to quantify and separate the neutral detergent fiber and neutral detergent soluble portions. If desired, moisture content may be determined from a subsample taken from the same sample as the first two, since dry matter concentration would be the same throughout the sample.

The basic procedure used to quantitate neutral detergent fiber was developed some years ago and is set forth in Agriculture Handbook No. 379 (Agric. Res. Serv., USDA, Washinton, D.C.). It has been employed with various modifications, the preferred procedure for purposes of the present invention being as follows:

Weigh 0.5 to 1.0 g sample and place in a 600 ml Berzelius beaker. Add 50 ml cold neutral-detergent solution, prepared according to Ag. Handbook 379. Place on hot plate and heat to boiling. Adjust heat to reduce foaming but boiling sufficiently to keep feed particles suspended. Thirty minutes from the onset of boiling, remove beaker and add 50 ml cold neutral-detergent solution and 2 ml of an enzyme (Amylase) solution. (Dissolve 2g Bacillus Subtiles type III Aαamylase in 90 ml of water, filter through Whatman #54 paper and add 10 ml Ethozyethanol). Return beaker to hotplate without adjusting the thermostat and allow to return to boiling. One hour after the initial onset of boiling, filter on a pretared sintered-glass crucible or Whatman #54 paper. Wash twice with boiling water to remove the detergent and twice with acetone. Dry overnight at 105° C. and weigh. Ash at 500° C. for three hours and weigh. The loss in weight in ashing is an estimate of the plant cell wall constitutents.

Crude protein, lipid and ash content of the whole dry matter sample, and of the neutral detergent fiber separated from the other sample are separately determined. The total protein content, expressed as 6.25 times the nitrogen content of the two materials, is determined according to Official Methods of Analysis of the Association of Official Agricultural Chemists (22.053), 10th ed., 1965. Lipid analysis (fat concentration) is performed by extracting the fat material in the feedstuff with ether. The materials are then exposed to a 500° C. oven for 3 hours, the remaining materials being weighed and constituting the ash portion.

Although it is the non-structural carbohydrate fraction of the sample which is to be quantitated, it is impractical to do so directly since reagents associated with the neutral detergent solution may interfere with quantitation of the crude protein, lipid and ash which are dissolved together with the soluble carbohydrates. In addition, no single method has been developed to permit direct quantitation of non-structural carbohydrates which include starches, sugars and pectins. Therefore, quantitation of crude protein, lipid and ash in the original feedstuff, and in the neutral detergent fiber portion thereof as described above allows the amount of non-structural carbohydrates to be determined by differences.

The following equation and example will demonstrate the calculation of non-structural carbohydrate for a specific feed ingredient. Equation: % Non-Structural Carbohydrate=[[Neutral Detergent Solubles]−[(-Crude Protein in original−Crude Protein in Neutral Detergent Fiber)+(Lipid in original−lipid in Neutral Detergent Fiber)+(Ash in original−Ash in Neutral Detergent Fiber)]]/fractional Dry Matter concentration, where: Neutral Detergent Solubles=100−Neutral Detergent Fiber (NDF)

Example of actual calculation for 48% soybean meal:

| | Chemical Analysis | | | |
|---|---|---|---|---|
| | Original Sample | | Neutral Detergent Fiber | |
| | As Fed basis | Dry Matter basis | As Fed basis | Dry Matter basis |
| Moisture (%) | 10.6 | 0.0 | 10.6 | 0.0 |
| NDF (%) | 9.1 | 10.2 | 89.4 | 100 |
| Crude protein (%) | 48.9 | 54.7 | .8 | .89 |
| Fat (%) | 1.0 | 1.1 | .6 | .67 |
| Ash (%) | 6.0 | 6.7 | .4 | .45 |

Calculation using all Dry Matter values:

| | |
|---|---|
| % Non-structural Carbohydrates (Dry Matter Basis) | = [(100 − 10.2) − [(54.7 − .89) + (1.1 − .67) + (6.7 − .45)] <br> = [(89.8 − [(53.8) + (.43) + d (6.25)]] <br> = [(89.8) − [(60.5)]] <br> = 29.3 |

Calculation using "As Fed" analysis, with corrections for Dry Matter:

| | |
|---|---|
| % Non-structural Carbohydrates (Dry Matter basis) | = [(100 − 10.6 − 9.1) − [(48.9 − .8) + (1.0 − .6) + (6.0 − .4)]]/.894 <br> = 29.3 |

The foregoing method was used to determine the structural and non-structural carbohydrate content of a number of different forages and grains, the results being tabulated in the following table, wherein N is the number of samples tested, NSC the percentage of dry matter constituted by non-structural carbohydrates, and SD the standard deviation of the mean:

TABLE I

| Ingredient | N | NSC Mean (% Dry Matter Basis) | | SD |
|---|---|---|---|---|
| Corn silage | 3 | 36.3 | ± | 5.4 |
| Hay crop silage | 3 | 27.6 | ± | 4.8 |
| Soybean meal | 4 | 29.5 | ± | 1.0 |
| Distillers grains | 3 | 21.8 | ± | 3.5 |
| Dried brewers grains | 4 | 13.2 | ± | 1.8 |
| Corn gluten feed | 3 | 34.1 | ± | 3.5 |
| Corn gluten meal | 3 | 25.5 | ± | 7.4 |
| Hominy | 3 | 57.6 | ± | .9 |
| Whole corn | 3 | 75.1 | ± | 2.8 |
| Wheat middlings | 3 | 34.0 | ± | 3.9 |
| Soybean hulls | 3 | 20.8 | ± | 2.3 |
| Beet pulp | 4 | 39.5 | ± | 2.9 |

The non-structural carbohydrate content of the various feedstuffs indicated in the preceding table differ significantly in some cases from those determined by previously used methods, such as those summarized earlier herein. The method of the present invention, involving the precise quantification of neutral detergent fiber, crude protein, fat and ash and calculating the non-structural carbohydrate content by subtracting the portions represented by all other components, provides a very accurate and repeatable measure of the percentage of non-structural carbohydrates. This is very useful in formulating dairy cow rations which, as shown in parent application Ser. No. 694,105, and in the continuation-in-part thereof, Ser. No. 772,011, filed Sept. 3, 1985, may be accurately regulated as to non-structural carbohydrate and neutral detergent fiber content to produce a positive response in milk production.

What is claimed is:

1. The method of determining the non-structural carbohydrate content of a feedstuff comprising:
   (a) weighing first and second, essentially chemically identical samples of said feedstuff;
   (b) determining the dry matter content of said first and second samples;
   (c) determining by chemical analysis the respective percentages of said first sample dry matter constituted by crude protein, lipid and ash;
   (d) separating said second sample into first and second parts, respectively comprising the parts which are soluble and insoluble in neutral detergent solution;
   (e) weighing said second part to determine the percentage of said second sample dry matter constituted thereby;
   (f) determining by chemical analysis the respective percentages of said second part of said second sample constituted by crude protein, lipid and ash;
   (g) subtracting from the percentages of crude protein, lipid and ash determined for said first sample, each of the respective quantities of crude protein, lipid and ash determined for said second part of said second sample, to obtain three difference figures; and
   (h) subtracting the sum of said three difference figures from said percentage of dry matter constituted by said second part of said second sample, and subtracting the result from 100, thereby providing a figure representing the percentage of said dry matter constituted by non-structural carbohydrates.

2. The method according to claim 1 wherein said first and second samples are ground finely enough to pass a 1 mm screen.

3. The method of claim 2 wherein said second sample is separated into first and second parts by boiling in neutral detergent solution and filtering, said second part being that which remains on the filter.

4. The method of claim 3 and comprising the further step of washing and drying said second part of said second sample prior to determining the percentages thereof constituted by crude protein, lipid and ash.

5. The method of claim 4 wherein said percentages of crude protein are determined by determining the percentage of nitrogen content of said first sample and said second part of said second sample and multiplying by 6.25.

6. The method of claim 5 wherein said percentages of lipid are determined by extracting the latter from said first sample and said second part of said second sample with ether.

7. The method of claim 6 wherein said percentages of ash are determined by exposing said first sample and said second portion of said second sample to 500° for 3 hours and weighing the remaining material.

* * * * *